Oct. 2, 1923.
R. S. BURDETTE
1,469,552
REGISTERING THERMOSTAT
Filed March 2, 1921   3 Sheets-Sheet 1
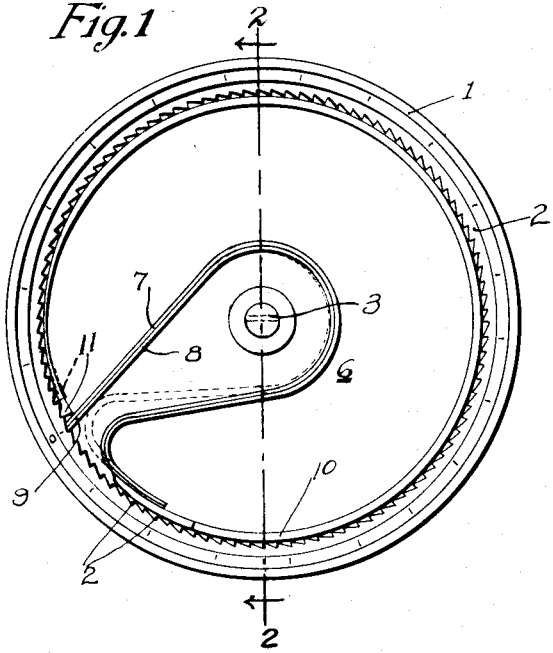
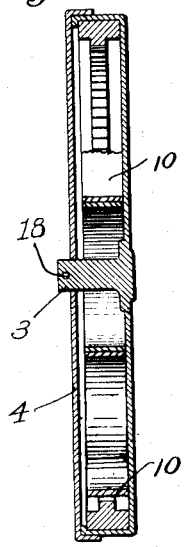
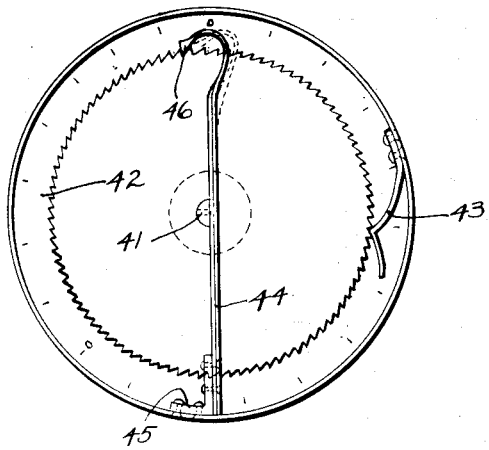
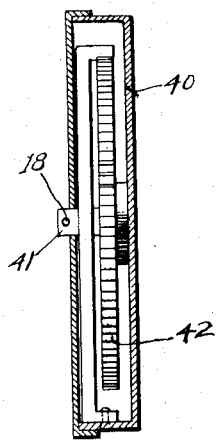
Inventor
Richard S. Burdette
By R. D. Trogner
Attorney Oct. 2, 1923.

R. S. BURDETTE 1,469,552

REGISTERING THERMOSTAT

Filed March 2, 1921    3 Sheets-Sheet 2

Inventor
Richard S. Burdette
By R. D. Trogner
Attorney

Oct. 2, 1923.
R. S. BURDETTE
1,469,552
REGISTERING THERMOSTAT
Filed March 2, 1921    3 Sheets-Sheet 3
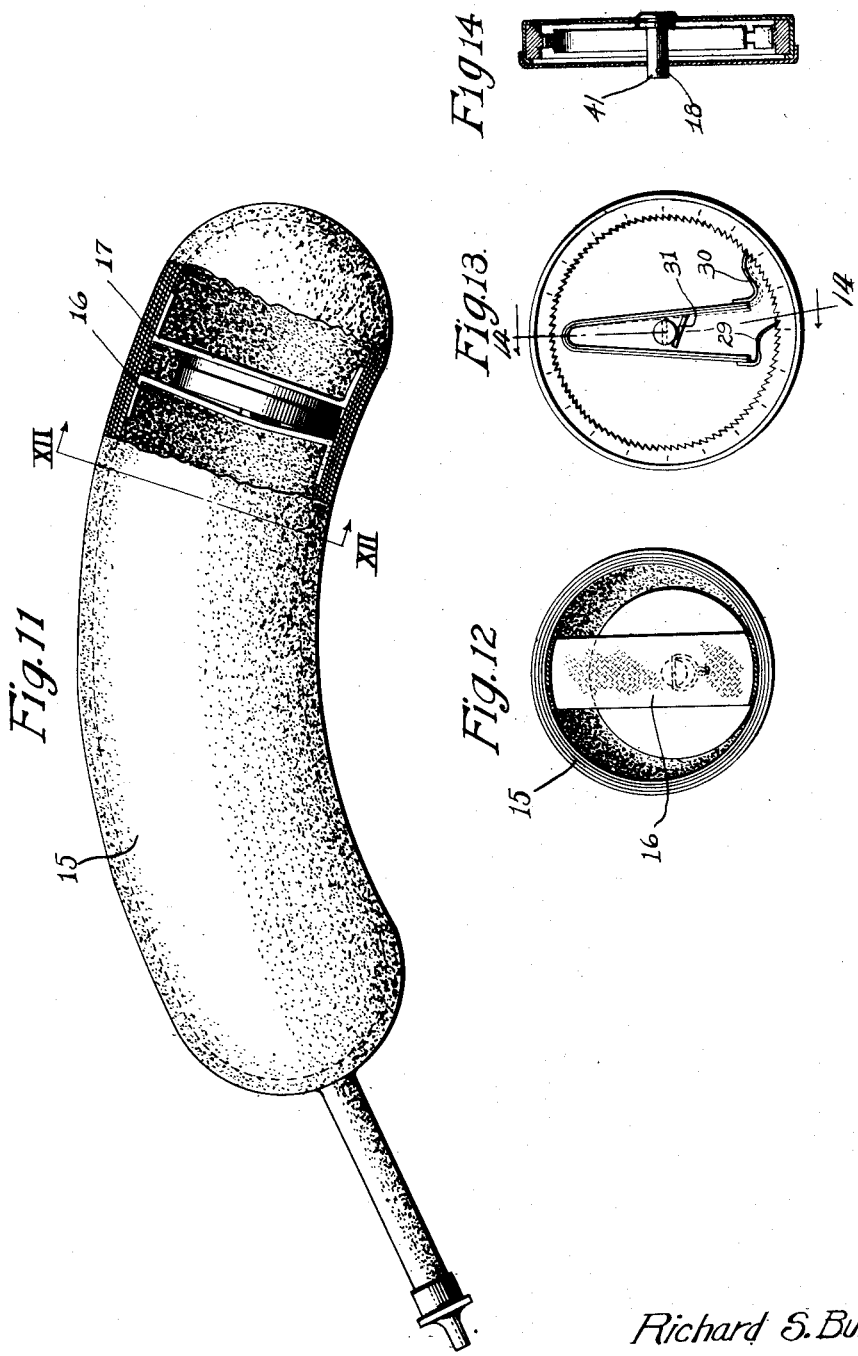

Patented Oct. 2, 1923.

1,469,552

UNITED STATES PATENT OFFICE.

RICHARD S. BURDETTE, OF AKRON, OHIO, ASSIGNOR TO THE GOODYEAR TIRE & RUBBER COMPANY, OF AKRON, OHIO, A CORPORATION OF OHIO.

REGISTERING THERMOSTAT.

Application filed March 2, 1921. Serial No. 449,202.

*To all whom it may concern:*

Be it known that I, RICHARD S. BURDETTE, a citizen of the United States, residing at Akron, in the county of Summit and State of Ohio, have invented new and useful Improvements in Registering Thermostats, of which the following is a specification.

My invention relates to thermostats and it has particular reference to registering thermostats for use with vulcanizing apparatus and the like.

The objects and advantages to be derived from practicing my invention will be apparent from the following description and the accompanying drawings. Like parts are indicated by corresponding numerals in the several figures of the drawings in which:

Fig. 1 is a plan view of a thermostat with the cover removed embodying my invention;

Fig. 2 is a sectional elevational view taken substantially on line 2—2 of Fig. 1;

Fig. 3 is a plan view, with the cover removed, of a modified form of thermostat embodying my invention;

Fig. 4 is a side elevational view of the thermostat shown in Fig. 3, with the casing cut away to show the interior mechanism of the thermostat;

Figure 5:
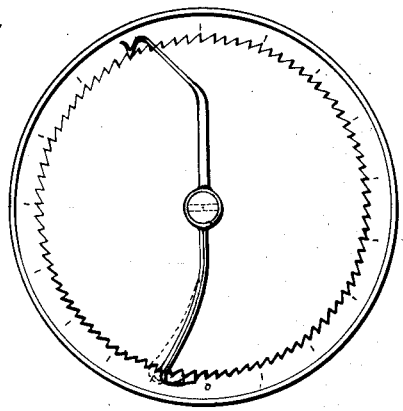
Figure 6:
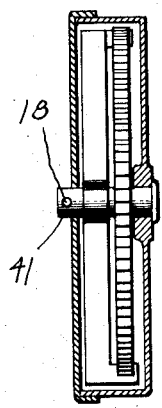
Figure 7:
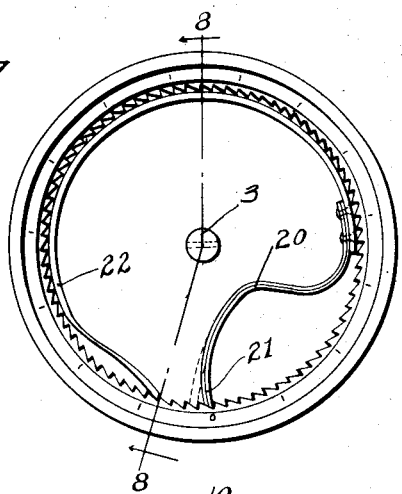
Figure 8:
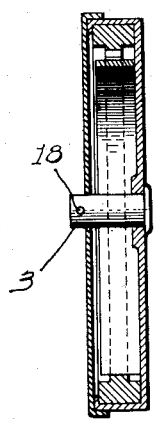
Figure 9:
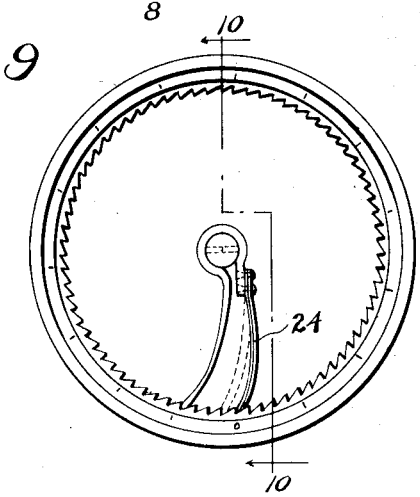
Figure 10:
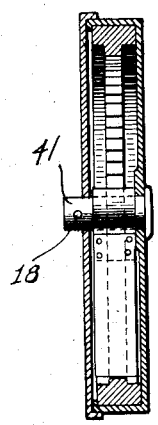

Figs. 5 and 6 respectively correspond to Figs. 3 and 4 and illustrate a further adaptation of my invention;

Fig. 7 is a plan view with the cover removed, of a further modification of the invention;

Fig. 8 is a sectional view on line 8—8 of Fig. 7;

Fig. 9 is a plan view of another form of my invention;

Fig. 10 is a sectional view on line 10—10 of Fig. 9.

Fig. 11 is a side elevational view, shown partially in section, of an air bag equipped with a thermostat constructed in accordance with my invention; and Fig. 12 is a sectional end view taken substantially on the line XII—XII of Figure 11 and showing the thermostat mounted within an air bag;

Fig. 13 is a plan view of an additional modification of the invention;

Fig. 14 is a sectional view on line 14—14 of Fig. 13.

A preferred embodiment of my invention, as it has been reduced to practice, is shown in Fig. 1 of the drawings. The thermostat, as here illustrated, embodies a casing 1 that has an internally toothed ratchet wheel 2 secured therein. A centrally disposed post 3, which is integral with the casing, extends through an opening in a cover 4 of the casing. The ratchet wheel 2 has a series of marks spaced in accordance with the number of teeth of the ratchet wheel and extending from a point marked "0." A thermostatic device 6 is mounted within the casing.

The thermostatic portion of the device 6 is of conventional form embodying two strips of metal 7 and 8 that have materially different temperature coefficients. The metal 8, having the larger temperature coefficient, is mounted on the outside of the loop to provide a loop that contracts when heat is applied.

The form of the loop is such that its two arms are spaced a predetermined distance apart when the thermostat is mounted within the casing in a manner to be later described. This predetermined separation of the two arms of the thermostat is preferably slightly greater than the length of one tooth of the ratchet wheel in order that when the thermostat is heated, it can only contract a predetermined distance regardless of the heat that is applied.

One end of the thermostatic loop is formed into a pawl 9 that engages the teeth of the ratchet wheel 2. The other end of the thermostatic element is connected to a resilient metal strip 10. A pawl 11, formed on the trailing end of the strip 10, is also adapted to engage the teeth of the ratchet wheel 2. The resilient strip 10 is of such form and resiliency as to maintain the pawls 9 and 11 in close engagement with the teeth of the ratchet wheel when the thermostatic device 6 is sprung into the casing.

The loop of the thermostatic element contracts in accordance with the degree of heat that is applied to the thermostatic device until the arms of the loop meet, as shown in dotted outline in Figs. 1 and 3 of the drawings. The relative movement of the two arms of the device is thus limited to the definite spaced relation shown and described in conjunction with these figures.

The operation of my device may best be explained by assuming that heat is applied to the thermostat shown in Figs. 1 and 2. The loop of the thermostat contracts in accordance with the degree of heat applied. The leading arm of the thermostatic loop, which terminates in the pawl 9, will be maintained in place by its engagement with the teeth of the ratchet wheel. The trailing arm of the thermostatic loop is drawn toward the leading arm by the contraction of the loop and thus the resilient band 10 and its trailing pawl 11 are dragged around the inside of the ratchet wheel in accordance with the contraction of the thermostat.

Since the movement of the two arms of the thermostat is limited by their degree of separation to a space somewhat greater than one tooth of the ratchet wheel, the pawl 11 will move to and engage an adjacent tooth, as shown by its dotted outline in Fig. 1. Since the pawl 11 latches in place when it passes the initial tooth position, a subsequent expansion of the thermostat element, by reason of the cooling of the device, causes the arms of the thermostat to again separate and the leading pawl 9, under these conditions, is pushed forward by the expansion of the thermostatic loop, whereas the trailing pawl 11 latches with a tooth of the ratchet wheel which prevents its movement during the cooling part of the temperature cycle.

Since the leading arm of the thermostatic loop engages the trailing pawl 11 with each cooling of the device, a reduction in the temperature of the thermostat materially below the point at which these pawl members engage, will not produce a change in their position. It should be noted in this connection that the movement of the pawl 9 of the thermostat between the limits imposed by the leading arm and the trailing pawl 11, insures that the thermostat will operate only for a predetermined range of temperature and that any temperature materially lower than the minimum temperature of that range, or any temperature that is materially higher than the maximum temperature of the range, will produce no more than a single operation of the device.

Figs. 11 and 12 show a device of this general character mounted within an air bag 15 of conventional design. The device is maintained in position by a pair of supporting brackets 16 and 17. The particular utility of the thermostat, when employed in this connection, is to indicate the number of times the air bag is used in the vulcanization of rubber articles in order that comparisons of several types and kinds of air bags may be made to determine the life of the bags.

An opening 18, provided in the end of the central post of the thermostat casing, may be employed to merely seal the thermostat when it is placed within the vulcanizing apparatus, such as the air bag 15, or an identifying tag, indicating the date when the thermostat was first placed in service, may be secured to the post by this means. The number of treatments through which the device passes during the life of the encasing air bag may be noted on the tag for purposes of record.

Figs. 7, 8, 9, 10, 13 and 14 show thermostats that embody the general characteristics of that shown in Figs. 1 and 2 but which employ slightly different forms of thermostatic elements. The casing, top and ratchet wheel of these devices are substantially the same as the corresponding parts of the thermostat shown in Fig. 1 whereas the thermostatic elements are of somewhat different design.

The thermostatic elements shown in Figs. 7, 8, 9 and 10 operate entirely in accordance with the degree of temperature change and do not record a definite and predetermined step for each cycle of temperature operation between or beyond predetermined points. For instance, the device shown in Fig. 7 will advance as far each time as the temperature rise causes the thermostatic element to move. This movement is different for each temperature rise, as indicated by the dotted outline of the thermostat 20 which carries the pawl 21. If the temperature increases materially beyond this point, the thermostatic element may advance over several teeth of the ratchet, thus recording several steps instead of the single step recorded by the instrument shown in Figures 1 and 2.

In a like manner, if this thermostat is cooled beyond the normal temperature for which it is designed, the contraction of the thermostatic element would be sufficient to draw the trailing pawl of the resilient ring 22 one or more steps around the ratchet wheel. The form of thermostat 24, as shown in Fig. 9, also embodies these general characteristics but differs from those previously described in that it is journaled on the central post of the casing.

The thermostat shown in Figs. 13 and 14 differs slightly from the structure illustrated in Figs. 1 and 2. This thermostatic element is of A-shape and has a pair of resilient pawls 29 and 30 that perform the functions of the corresponding pawls 9 and 11 of the previously described thermostats. The central arm 31 of this device, which engages the central post of the thermostatic element, is of such length that it limits the contraction of the thermostatic loop to a predetermined distance. Since devices of this kind are generally used for determining a temperature cycle greater than ordinary atmospheric temperature, and since the increase in temperature causes a contraction of the thermostatic loop, the pawls 29 and 30 will advance only a single step for each temperature range regardless of the maximum temperature to which the device is subjected. Since the variation of atmospheric temperature is very small as compared with the range of the temperature cycle, this device will obviously record only a single step for each temperature cycle.

The thermostat shown in Figs. 3 and 4 embodies a casing 40 having a centrally located post 41 and a ratchet wheel 42 journaled thereon. A pawl 43, which is resiliently biased to engagement with the ratchet teeth, is secured within the casing. A thermostatic element 44 extends from one side of the casing, to which it is secured by means of the bracket 45, diametrically across the casing to resiliently engage the ratchet teeth through a pawl 46.

The operation of this device is substantially the same as the preceding devices. An increase in temperature distorts the thermostatic element 44 and causes the pawl 46 to move the ratchet wheel a predetermined number of steps. The pawl 43, which also engages the teeth of the ratchet wheel, prevents a return of the ratchet wheel when the decrease in temperature causes a return of the thermostatic element 44 to its normal form shown in the drawing. The number of temperature cycles to which this device is subjected will, therefore, be accurately registered by the movement of a mark on the rotatable ratchet wheel with reference to a corresponding mark on the casing. A graduated scale inscribed on the periphery of the casing indicates this degree of movement.

Figs. 5 and 6 show a device in which the thermostatic element is pivotally mounted on the central post of the casing and in which a ratchet is provided on each end of the thermostatic element in such manner that when the thermostatic element expands and contracts for each temperature cycle, it will advance a predetermined number of steps around the periphery of the ratchet wheel. In this particular device, the ratchet wheel is secured to the casing on which the graduations appear. It may, however, be desirable to secure the thermostatic element to the central post to prevent its rotary movement and to pivotally mount the ratchet wheel in such manner that when the movement of the thermostatic element occurs, the ratchet wheel will be rotated in accordance with such movement.

Although I have described only a few of the more important modifications of my invention, it is my desire that only such limitations shall be imposed as are indicated by the spirit and scope of the appended claims.

What I claim is:

1. The combination with an air bag, of an indicating device mounted therein and adapted to indicate the total number of times the bag is used for vulcanizing purposes, said device comprising an indicator, a thermostat adapted to actuate said indicator, and means adapted to retain said indicator in its actuated position for each cycle of temperature change.

2. A recording mechanism comprising an indicator, thermostatic means for advancing said indicator a predetermined degree for each rise above a predetermined temperature, and means adapted to retain said indicator in each advanced position.

3. A recording mechanism comprising an indicator, a thermostat adapted to advance said indicator one step each time the temperature of said thermostat increases to a predetermined value and subsequently decreases to a predetermined value, and means for preventing the registration by the indicator of more than one step for each temperature cycle regardless of the maximum and minimum values thereof.

4. A registering thermostat comprising a ratchet ring, a thermostatic element having a pawl adapted to engage said ring, means for preventing relative movement of the thermostatic element and the ring in one direction, and means for preventing more than a predetermined degree of movement of the thermostatic element and the ring in the other direction.

5. A registering thermostat comprising a ring having a serrated surface, a thermostatic element having a leading and a trailing leg, both legs making ratchet engagement with the surface, and adapted to travel in only one direction around said surface, and means for preventing more than a single unitary advance of the element relative to the serrated surface for each operation.

6. A registering thermostat comprising a ratchet ring, a thermostatic element having a pawl adapted to engage said ring and to prevent relative movement of the ring and the element in one direction, and a second pawl adapted to prevent relative movement of the ring and the element in the other direction.

7. A registering thermostat comprising a ratchet ring, a thermostatic element having a pawl adapted to engage said ring and to prevent relative movement of the ring and the element in one direction, and a second pawl associated with the thermostatic element and adapted to prevent relative movement of the ring and the element in the other direction.

8. A registering thermostat comprising a ratchet ring, a thermostatic element having a pawl adapted to engage said ring, said thermostatic element being bent into the form of a loop and arranged in such manner that more than a predetermined degree of relative movement of the ring and the thermostatic element for a single temperature rise is prevented, and a second pawl adapted to prevent relative movement of the ring and the element in one direction.

9. A registering thermostat comprising a ratchet, a thermostatic element held in engagement with the ratchet and having a pawl adapted to engage the serrated surface thereof, means for preventing relative movement of the ratchet and element in one direction, and means for preventing more than a predetermined degree of movement of the ratchet and thermostatic element in the other direction for a single cycle of operation of the device.

In witness whereof I have hereunto signed my name in the presence of two subscribing witnesses.

RICHARD S. BURDETTE.

Witnesses:
J. E. KEATING,
WM. C. MCCOY.